US006895761B2

(12) United States Patent
Mitchell et al.

(10) Patent No.: US 6,895,761 B2
(45) Date of Patent: May 24, 2005

(54) MOUNTING ASSEMBLY FOR THE AFT END OF A CERAMIC MATRIX COMPOSITE LINER IN A GAS TURBINE ENGINE COMBUSTOR

(75) Inventors: Krista Anne Mitchell, Springboro, OH (US); David Edward Bulman, Cincinnati, OH (US); Mark Eugene Noe, Morrow, OH (US); Harold Ray Hansel, Mason, OH (US); Thomas Allen Wells, West Chester, OH (US); Christopher Charles Glynn, Hamilton, OH (US); John David Bibler, Tucson, AZ (US); Toby George Darkins, Jr., Loveland, OH (US); Joseph John Charneski, Maineville, OH (US); Craig Patrick Burns, Mason, OH (US)

(73) Assignee: General Electric Company, Schenectady, NY (US)

( * ) Notice: Subject to any disclaimer, the term of this patent is extended or adjusted under 35 U.S.C. 154(b) by 180 days.

(21) Appl. No.: 10/326,209

(22) Filed: Dec. 20, 2002

(65) Prior Publication Data

US 2004/0118127 A1 Jun. 24, 2004

(51) Int. Cl.[7] .................................................. F02C 7/20
(52) U.S. Cl. ............................. 60/796; 60/752; 60/753; 60/803
(58) Field of Search .......................... 60/753, 752, 796, 60/799, 800, 804, 798

(56) References Cited

U.S. PATENT DOCUMENTS

| | | | | | |
|---|---|---|---|---|---|
| 5,285,632 | A | | 2/1994 | Halila | 60/39.31 |
| 5,289,677 | A | * | 3/1994 | Jarrell | 60/796 |
| 5,291,732 | A | | 3/1994 | Halila | 60/39.31 |
| 5,291,733 | A | | 3/1994 | Halila | 60/39.31 |
| 5,353,587 | A | | 10/1994 | Halila | 60/39.37 |
| 5,363,643 | A | | 11/1994 | Halila | 60/39.31 |
| 5,592,814 | A | | 1/1997 | Palusis et al. | 60/271 |
| 5,701,733 | A | * | 12/1997 | Lewis et al. | 60/796 |
| 6,042,315 | A | * | 3/2000 | Miller et al. | 411/411 |
| 6,397,603 | B1 | * | 6/2002 | Edmondson et al. | 60/753 |
| 6,401,447 | B1 | * | 6/2002 | Rice et al. | 60/796 |
| 6,415,610 | B1 | * | 7/2002 | Parker | 60/798 |
| 6,606,861 | B2 | * | 8/2003 | Snyder | 60/752 |
| 6,655,148 | B2 | * | 12/2003 | Calvez et al. | 60/753 |
| 6,675,585 | B2 | * | 1/2004 | Calvez et al. | 60/796 |
| 6,718,774 | B2 | * | 4/2004 | Razzell | 60/798 |
| 2002/0108378 | A1 | | 8/2002 | Ariyoshi et al. | |

OTHER PUBLICATIONS

"ESPR Combustor Concept," Kawasaki Heavy Industries, Ltd. (Mar. 2000), Cover sheet and figure (partially screened).

Hiroyuki Ninomiya et al., "Development of Low NOx LPP Combustor," The First International Symposium of Environmentally Compatible Propulsion System for Next–Generation Supersonic Transport, Tokyo, Japan (May 21–22, 2002), p. 1–6.

* cited by examiner

*Primary Examiner*—Justine R. Yu
*Assistant Examiner*—William H. Rodriguez
(74) *Attorney, Agent, or Firm*—William Scott Andes; James P. Davidson

(57) ABSTRACT

A mounting assembly for an aft end of a liner of a gas turbine engine combustor including a support member, wherein a longitudinal centerline axis extends through the gas turbine engine. The mounting assembly includes a pin member extending through each one of a plurality of circumferentially spaced openings in a portion of the support member for the combustor and into a plurality of partial openings formed in the aft end of the liner, with each pin member including a head portion at one end thereof, and a device positioned within each opening in the support member so as to retain the pin members therein. The pin members and the support member are able to slide radially and/or axially with respect to the liner aft end as the support member experiences thermal growth greater than the liner.

36 Claims, 8 Drawing Sheets

MOUNTING ASSEMBLY FOR THE AFT END OF A CERAMIC MATRIX COMPOSITE LINER IN A GAS TURBINE ENGINE COMBUSTOR

STATEMENT REGARDING FEDERALLY SPONSORED RESEARCH AND DEVELOPMENT

The U.S. Government may have certain rights in this invention pursuant to contract number NAS3-27720.

BACKGROUND OF THE INVENTION

The present invention relates generally to the use of Ceramic Matrix Composite liners in a gas turbine engine combustor and, in particular, to the mounting of such CMC liners to a support member of the combustor at an aft end so as to accommodate differences in radial and axial growth.

It will be appreciated that the use of non-traditional high temperature materials, such as Ceramic Matrix Composites (CMC), are being studied and utilized as structural components in gas turbine engines. There is particular interest, for example, in making combustor components which are exposed to extreme temperatures from such material in order to improve the operational capability and durability of the engine. As explained in U.S. Pat. No. 6,397,603 to Edmondson et al., substitution of materials having higher temperature capabilities than metals has been difficult in light of the widely disparate coefficients of thermal expansion when different materials are used in adjacent components of the combustor. This can result in a shortening of the life cycle of the components due to thermally induced stresses, particularly when there are rapid temperature fluctuations which can also result in thermal shock.

Accordingly, various schemes have been employed to address problems that are associated with mating parts having differing thermal expansion properties. As seen in U.S. Pat. No. 5,291,732 to Halila, U.S. Pat. No. 5,291,733 to Halila, and U.S. Pat. No. 5,285,632 to Halila, an arrangement is disclosed which permits a metal heat shield to be mounted to a liner made of CMC so that radial expansion therebetween is accommodated. This involves positioning a plurality of circumferentially spaced mount pins through openings in the heat shield and liner so that the liner is able to move relative to the heat shield.

U.S. Pat. No. 6,397,603 to Edmondson et al. also discloses a combustor having a liner made of Ceramic Matrix Composite materials, where the liner is mated with an intermediate liner dome support member in order to accommodate differential thermal expansion without undue stress on the liner. The Edmondson et al. patent further includes the ability to regulate part of the cooling air flow through the interface joint.

Accordingly, it would be desirable for a mounting assembly to be developed for a CMC liner which is able to accommodate differences in axial and radial growth between such liner at an aft end and a support member of the combustor while maintaining the circumferential position of such liner with respect thereto.

BRIEF SUMMARY OF THE INVENTION

In a first exemplary embodiment of the invention, a mounting assembly for an aft end of a liner of a gas turbine engine combustor including a support member is disclosed, wherein a longitudinal centerline axis extends through the gas turbine engine. The mounting assembly includes a pin member extending through each one of a plurality of circumferentially spaced openings in a portion of the support member for the combustor and into a plurality of partial openings formed in the aft end of the liner, with each pin member including a head portion at one end thereof, and a device positioned within each opening in the support member so as to retain the pin members therein. The pin members and the support member are able to slide radially and/or axially with respect to the liner aft end as the support member experiences thermal growth greater than the liner.

In a second exemplary embodiment of the invention, a combustor for a gas turbine engine having a longitudinal centerline axis extending therethrough is disclosed as including: an outer liner having a forward end and an aft end, with the outer liner being made of a ceramic matrix composite material; an outer casing located substantially parallel to the outer liner so as to form an outer passage therebetween, the outer casing being made of a metal; an outer support member associated with the outer casing and located adjacent the outer liner aft end, the outer support member being made of a metal; and, an assembly for mounting the outer liner to the outer support member. In this way, the outer support member is movably connected to the outer liner aft end in a radial and/or axial direction as the outer casing and the outer support member experience thermal growth greater than the outer liner.

In accordance with a third embodiment of the invention, a combustor for a gas turbine engine having a longitudinal centerline axis extending therethrough is disclosed as including: an inner liner having a forward end and an aft end, the inner liner being made of a ceramic matrix composite material; an inner support cone located substantially parallel to the inner liner so as to form an inner passage therebetween, the inner support cone being made of a metal; and, an assembly for mounting the inner liner aft end to the inner support cone. In this way, the inner support cone is movably connected to the inner liner aft end in a radial and/or axial direction as the inner support cone experiences thermal growth greater than the inner liner.

In accordance with a fourth embodiment of the invention, a method of mounting an aft end of a liner to a support member of a combustor in a gas turbine engine having a longitudinal centerline axis is disclosed, wherein the liner is made of a material having a lower coefficient of thermal expansion than the support member. The method includes the steps of fixedly connecting the support member to a stationary portion of the gas turbine engine and connecting the liner aft end to the support member in a manner so as to permit radial movement of the support member with respect to the liner aft end. Additional steps may include connecting the liner aft end to the support member in a manner so as to permit axial movement of the support member with respect to the liner aft end and preventing circumferential movement of the support member with respect to the liner aft end.

In accordance with a fifth embodiment of the invention, a mounting assembly for an aft end of a liner of a gas turbine engine combustor including a support member is disclosed, wherein a longitudinal centerline axis extends through the gas turbine engine. The mounting assembly includes a pin member extending through each one of a plurality of circumferentially spaced openings in a first portion of the support member for the combustor, a plurality of openings formed in the aft end of the liner and into a plurality of partial openings formed in a second portion of the support member oriented substantially parallel to the support member first portion, each pin member including a head portion at one end thereof, and a device positioned within each opening in the support member first portion so as to retain the pin members therein. The pin members and the support member are able to slide radially and/or axially with respect to the liner aft end as the support member experiences thermal growth greater than the liner. The support member also includes a third portion connecting the first and second support member portions, wherein a gap for receiving the liner aft end is defined between the first and second support member portions.

DETAILED DESCRIPTION OF THE INVENTION

Figure 1:
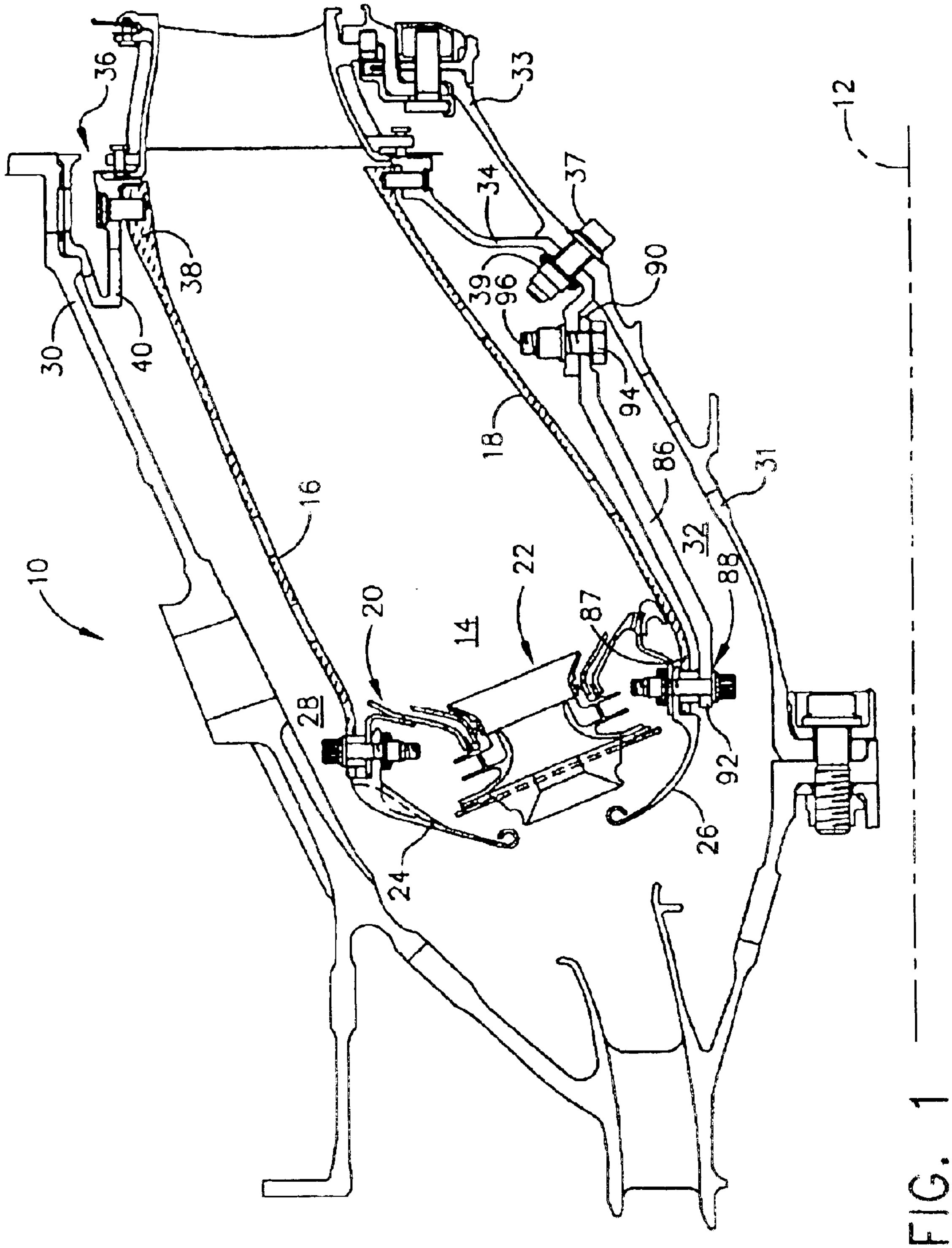
FIG. 1 is a longitudinal cross-sectional view of a gas turbine engine combustor including an outer liner and an inner liner mounted in accordance with the present invention.

Referring now to the drawings in detail, wherein identical numerals indicate the same elements throughout the figures, FIG. 1 depicts an exemplary gas turbine engine combustor 10 which conventionally generates combustion gases that are discharged therefrom and channeled to one or more pressure turbines. Such turbine(s) drive one or more pressure compressors upstream of combustor 10 through suitable shaft(s). A longitudinal or axial centerline axis 12 is provided through the gas turbine engine for reference purposes.

It will be seen that combustor 10 further includes a combustion chamber 14 defined by an outer liner 16, an inner liner 18 and a dome 20. Combustor dome 20 is shown as being single annular in design so that a single circumferential row of fuel/air mixers 22 are provided within openings formed in such dome 20, although a multiple annular dome may be utilized. A fuel nozzle (not shown) provides fuel to fuel/air mixers 22 in accordance with desired performance of combustor 10 at various engine operating states. It will also be noted that an outer annular cowl 24 and an inner annular cowl 26 are located upstream of combustion chamber 14 so as to direct air flow into fuel/air mixers 22, as well as an outer passage 28 between outer liner 16 and a casing 30 and an inner passage 32 between inner liner 18 and an inner casing 31. An inner annular support member 34, also known herein as an inner support cone, is further shown as being connected to a nozzle support 33 by means of a plurality of bolts 37 and nuts 39. In this way, convective cooling air is provided to the outer surfaces of outer and inner liners 16 and 18, respectively, and air for film cooling is provided to the inner surfaces of such liners. A diffuser (not shown) receives the air flow from the compressor(s) and provides it to combustor 10.

It will be appreciated that outer and inner liners 16 and 18 are preferably made of a Ceramic Matrix Composite (CMC), which is a non-metallic material having high temperature capability and low ductility. Exemplary composite materials utilized for such liners include silicon carbide, silicon, silica or alumina matrix materials and combinations thereof. Typically, ceramic fibers are embedded within the matrix such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). CMC materials typically have coefficients of thermal expansion in the range of about $1.3\times10^{-6}$ in/in/° F. to about $3.5\times10^{-6}$ in/in/° F. in a temperature of approximately 1000–1200° F.

By contrast, outer casing 30, nozzle support 33, inner support cone 34 and an outer support member 40 are typically made of a metal, such as a nickel-based superalloy (having a coefficient of thermal expansion of about $8.3–8.6\times10^{-6}$ in/in/° F. in a temperature range of approximately 1000–1200° F.). Thus, liners 16 and 18 are better able to handle the extreme temperature environment presented in combustion chamber 14 due to the materials utilized therefor, but attaching them to the different materials utilized for outer casing 30, nozzle support 33, inner support cone 34 and outer support member 40 presents a separate challenge. Among other limitations, components cannot be welded to the CMC material of outer and inner liners 16 and 18.

Figure 2:
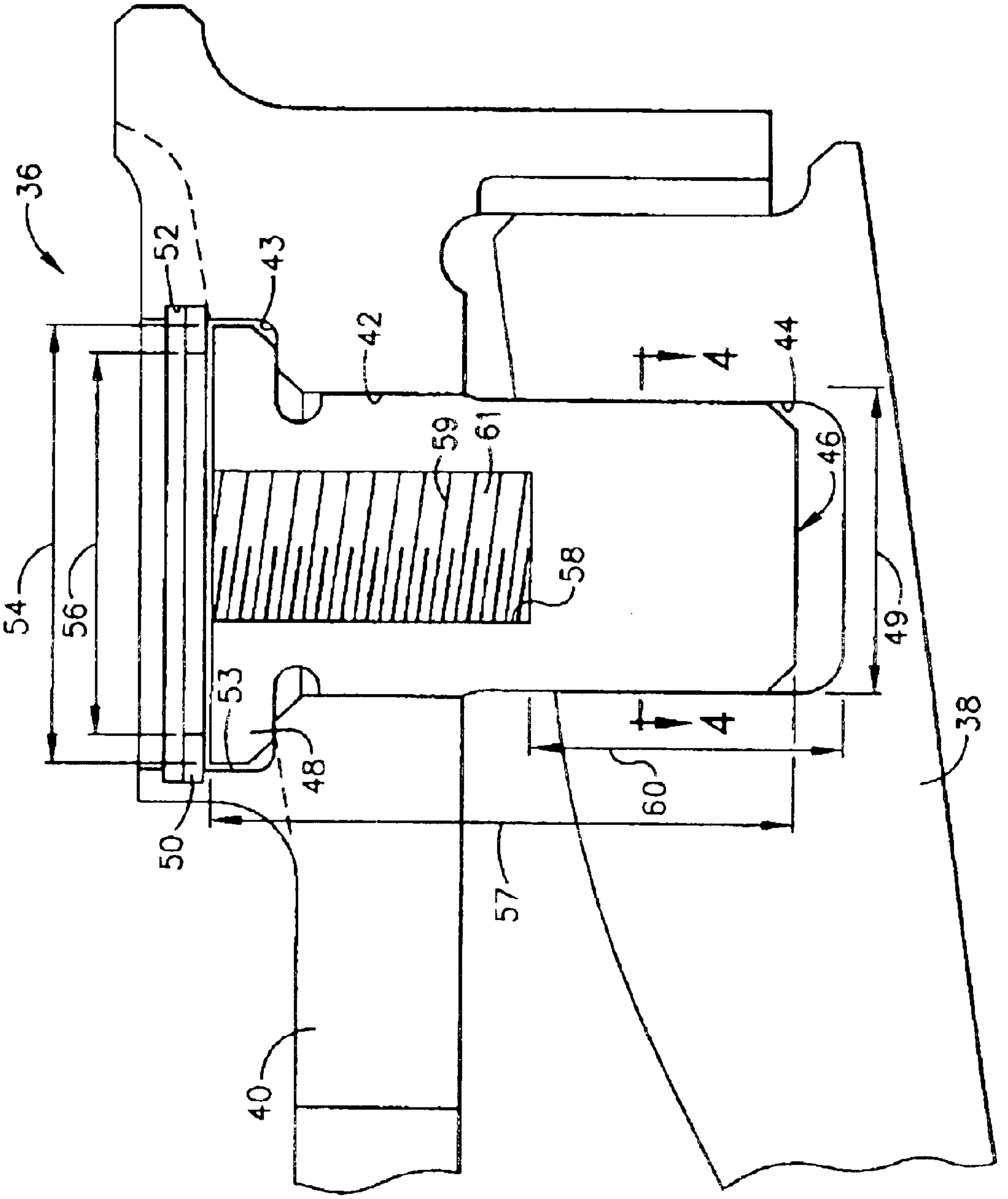
FIG. 2 is an enlarged, partial cross-sectional view of the combustor depicted in FIG. 1, where an embodiment of the mounting assembly for an aft end of the outer liner is shown prior to any thermal growth experienced by the outer liner, the outer casing, and the outer support member.
Figure 3:
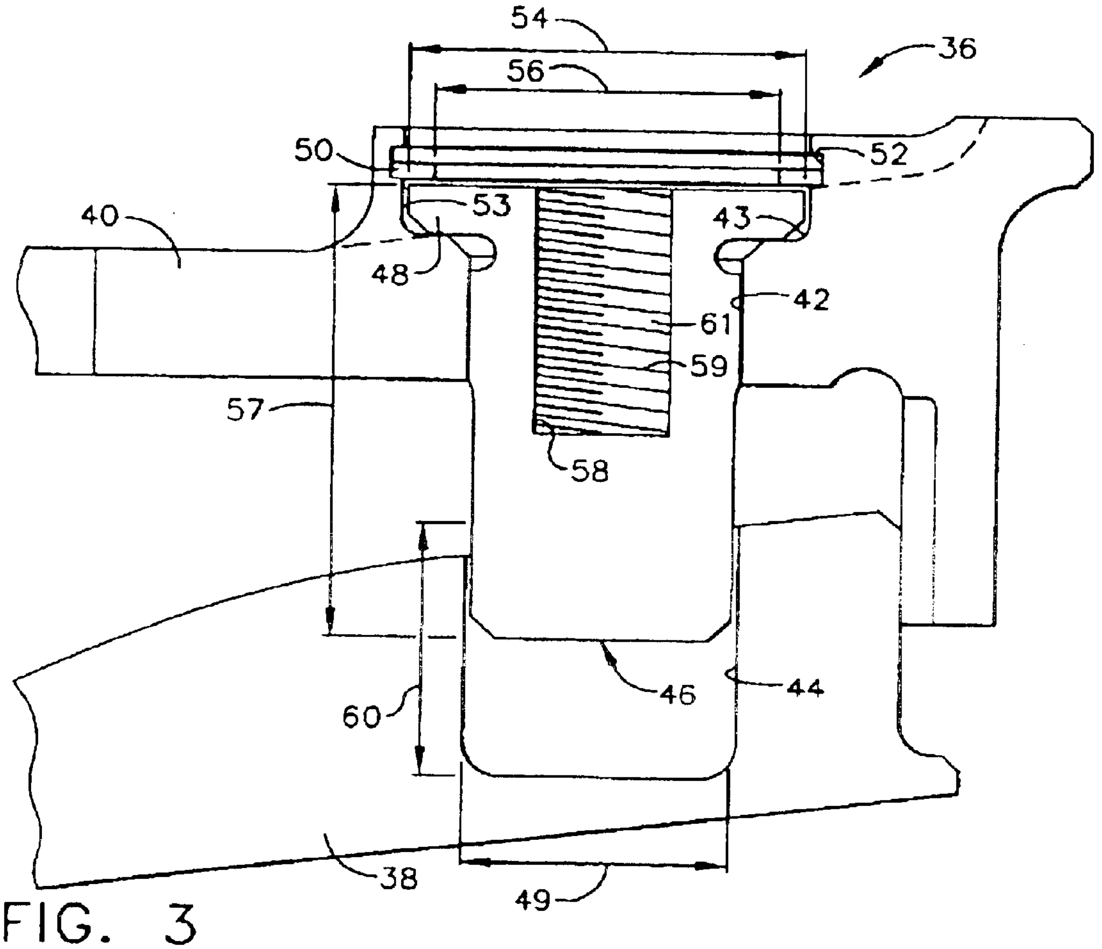
FIG. 3 is an enlarged, partial cross-sectional view of combustor depicted in FIG. 1, where the embodiment of the mounting assembly for an aft end of the outer liner of FIG. 2 is shown after thermal growth is experienced by the outer liner, the outer casing, and the outer support member.

Accordingly, it will be seen in FIG. 2 that a mounting assembly 36 is provided for an aft end 38 of outer liner 16 and an outer support member 40 so as to accommodate varying thermal growth experienced by such components. It will be appreciated that mounting assembly 36 shown in FIG. 2 is prior to any thermal growth experienced by outer liner 16, outer casing 30 and outer support member 40. As seen in FIG. 3, however, outer liner 16, outer casing 30 and outer support member 40 have each experienced thermal growth, with outer casing 30 and outer support member 40 having experienced greater thermal growth than outer liner 16 due to their higher coefficients of thermal expansion. Accordingly, outer casing 30 and outer support member 40 are depicted as being permitted to slide or move in a radial direction with respect to longitudinal centerline axis 12 away from outer liner aft end 38.

More specifically, it will be understood that outer support member 40 includes a plurality of circumferentially spaced openings 42 formed in a portion thereof and outer liner aft end 38, which has an increased thickness, preferably includes a plurality of circumferentially spaced partial openings or holes 44 (i.e., which do not extend completely through liner aft end 38) formed therein which are positioned so as to be in alignment therewith. A pin member 46 preferably extends through each opening 42 and is received in a corresponding partial opening 44 in outer liner aft end 38. Pin members 46 each include a head portion 48 at one end thereof. Openings 42 may include a portion 43 which is either chamfered or otherwise has an enlarged radius so as to better receive head portion 48 of pin members 46. The location and/or depth of such portion 43 may also be utilized to verify that pin members 46 are properly positioned within partial openings 44 of outer liner aft end 38.

A device 50 is provided within a groove portion 52 formed in a sidewall 53 defining opening 42 in outer support member 40. Device 50, which preferably is a ring-shaped member and is commonly known as a snap ring, is positioned within opening 42 of outer support member 40 in order to retain pin member 46 therein. In such case, ring member 50 is compressed against an outwardly expanding force until adjacent groove portion 52 and then released therein. It will then be appreciated that a diameter 54 of pin head portion 48 is greater than an inner diameter 56 of ring member 50 to provide a mechanical stop.

Figure 4:
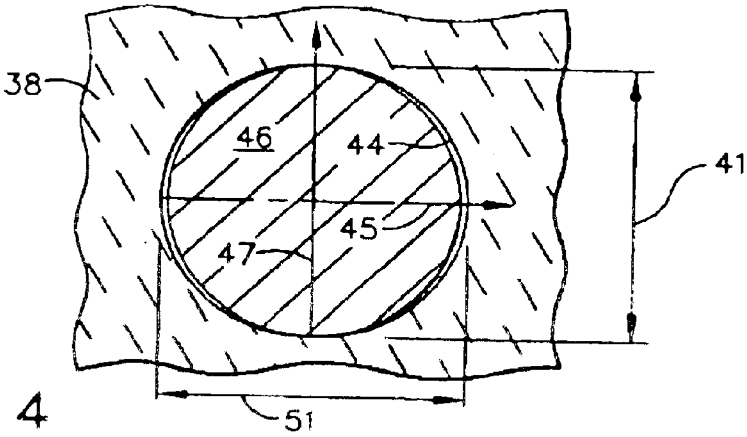
FIG. 4 is an enlarged, partial top view of the mounting assembly depicted in FIGS. 2 and 3 taken along line 4—4.

Of course, partial openings 44 in outer liner aft end 38 are preferably sized so that pin members 46, and therefore outer support member 40 and outer casing 30, are able to slide radially with respect to outer liner aft end 38 as outer support member 40 and/or outer casing 30 experience thermal growth greater than outer liner 16. Accordingly, outer support member 40 and outer casing 30 are able to move between a first radial position (see FIG. 2) and a second radial position (see FIG. 3). Partial openings 44 may be substantially circular (when viewed from a top radial perspective) so as to permit only radial movement of pin members 46, outer support member 40 and outer casing 30, but preferably are ovular in shape (see FIG. 4) so that a major axis 45 thereof is aligned substantially parallel to longitudinal centerline axis 12. In this way, pin members 46, outer support member 40 and outer casing 30 are able to slide axially with respect to outer liner aft end 38 when thermal growth of outer support member 40 and/or outer casing 30 is greater than outer liner aft end 38. This design of partial openings 44 also serves as a stack-up tolerance during assembly of combustor 10. It will be appreciated that outer support member 40 and/or outer casing 30 are also able to move between a first axial position (see FIG. 2) and a second axial position (see FIG. 3). Partial openings 44 will also preferably have a circumferential length 41 along a minor axis 47 which is substantially the same as a diameter 49 for openings 42 so that circumferential movement of outer support member 40 and outer casing 30 is discouraged. It will be understood that a length 57 of pin members 46, a depth 60 of partial openings 44, and an axial length 51 along major axis 45 of partial openings 44 will be sized so as to permit a desirable amount of thermal growth for outer support member 40 and outer casing 30.

It will further be noted that each pin member 46 preferably includes a partial opening 58 formed therein which includes threads 59 along a sidewall 61 thereof. This is provided so that there will be an easy way of retrieving pin member 46 once ring member 50 is removed. More specifically, a tool or other device may be threadably mated with threads 59 of partial opening 58 so that pin member 46 may be lifted out of opening 42 and partial opening 44.

Figure 5:
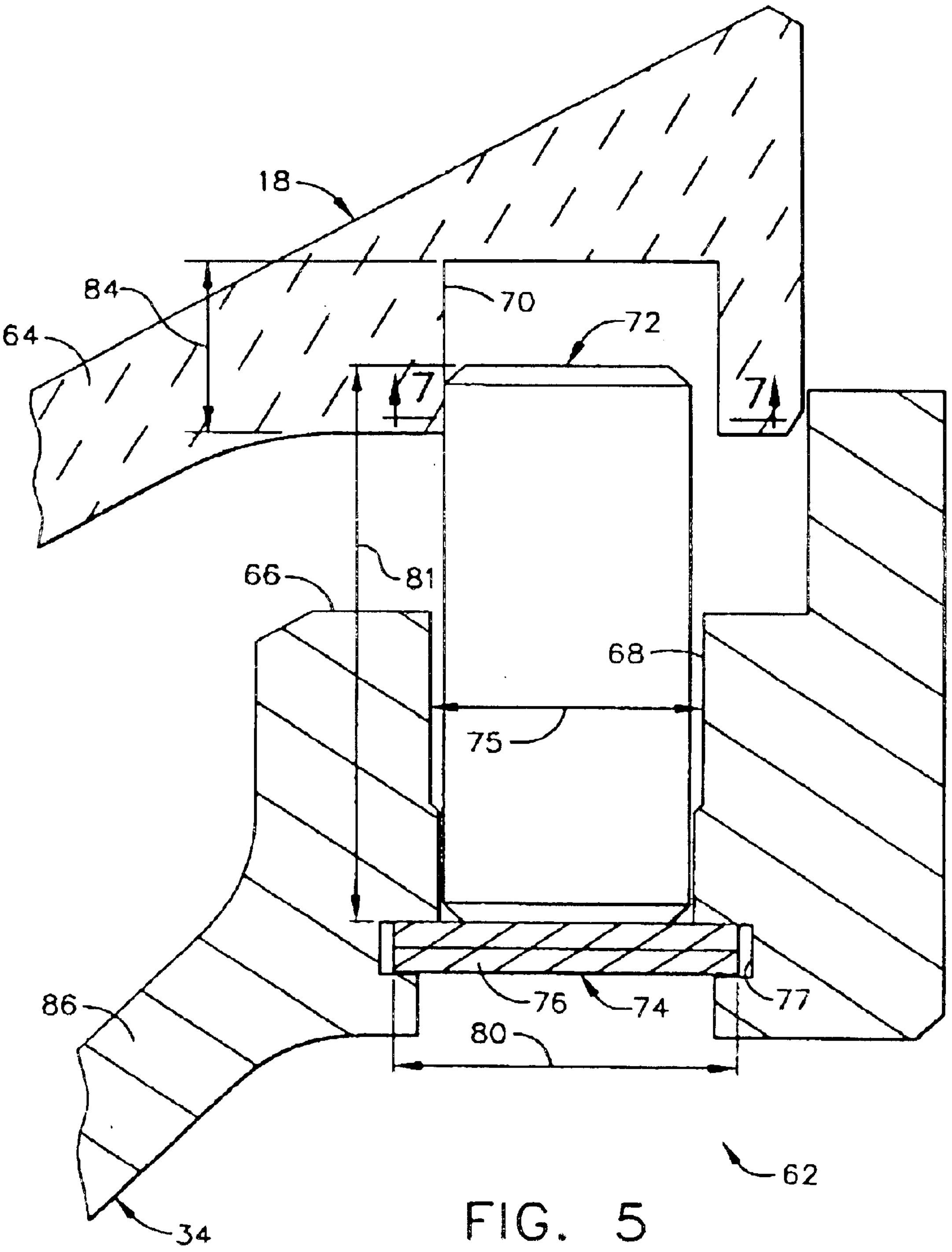
FIG. 5 is an enlarged, partial cross-sectional view of the combustor depicted in FIG. 1, where an embodiment of the mounting assembly for an aft end of the inner liner is shown prior to any thermal growth experienced by the inner liner, the nozzle support, and the inner annular cone.
Figure 6:
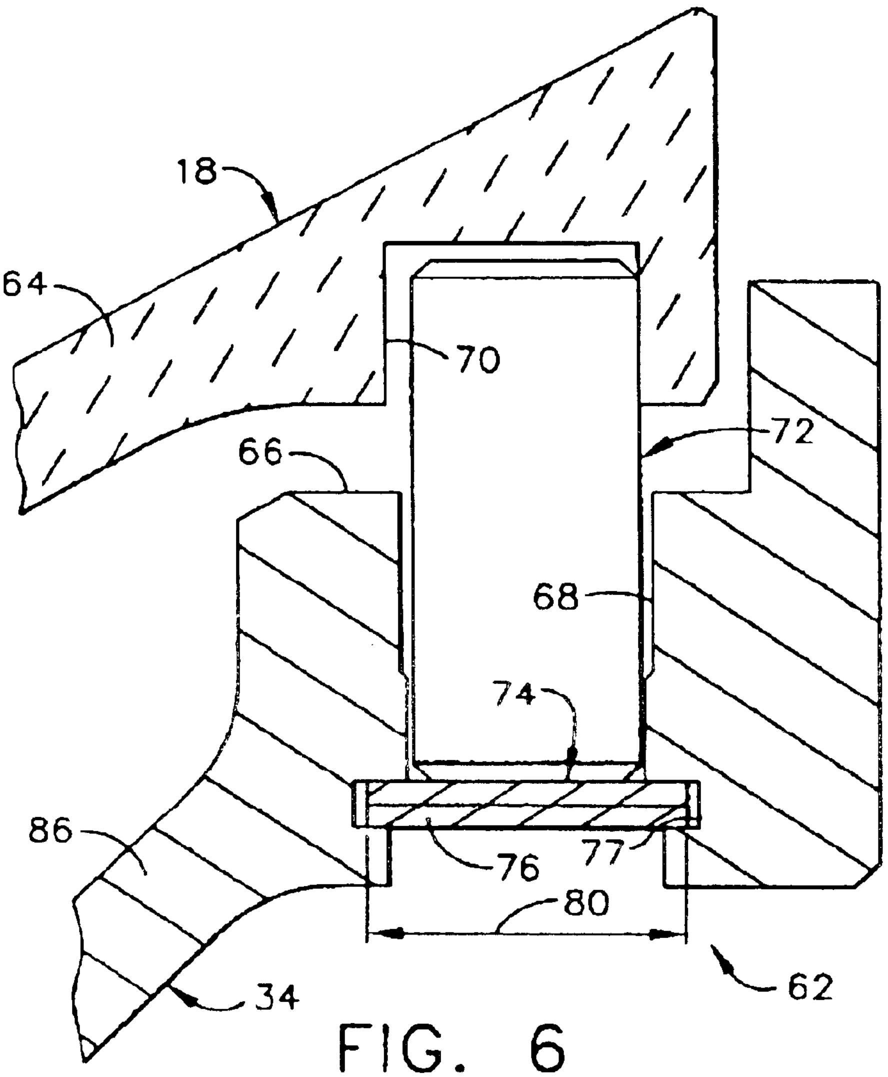
FIG. 6 is an enlarged, partial cross-sectional view of the combustor depicted in FIG. 1, where the embodiment of the mounting assembly for an aft end of the inner liner of FIG. 5 is shown after thermal growth is experienced by the inner liner, the nozzle support, and the inner annular cone.

Similarly, it will be see in FIG. 5 that a mounting assembly 62 is provided for an aft end 64 of inner liner 18 and inner support cone 34. It will be appreciated that mounting assembly 62 shown in FIG. 5 is prior to any thermal growth experienced by inner liner 18, inner support cone 34 and possibly nozzle support 33. As seen in FIG. 6, however, inner liner 18, nozzle support 33 and inner support cone 34 have each experienced thermal growth, with inner support cone 34 and nozzle support 33 having experienced greater thermal growth than inner liner 18 due to their higher coefficients of thermal expansion. Accordingly, inner support cone 34 is depicted as being permitted to slide or move in a radial direction with respect to longitudinal centerline axis 12 toward inner liner 18.

More specifically, it will be understood that inner support cone 34 has a plurality of circumferentially spaced openings 68 formed in a portion 66 thereof and inner liner aft end 64, which has an increased thickness, preferably includes a plurality of circumferentially spaced partial openings or holes 70 formed therein which are positioned so as to be in alignment with openings 68. A pin member 72 preferably extends through each opening 68 and is received in a corresponding partial opening 70 in inner liner aft end 64. Pin members 72 may each include a head portion at one end thereof as described with respect to pin head portion 48 herein. In such case, openings 68 may include a portion which is either chamfered or otherwise has an enlarged diameter so as to better receive such head portion of pin members 72. Further, the location and/or depth of such portion may also be utilized to verify that pin members 72 are properly positioned within partial openings 70 of inner liner aft end 64.

As seen in FIGS. 5 and 6, however, an alternate device 74 is utilized to retain pin members 72 in openings 68 and partial openings 70. In particular, it will be understood that a flexible metal band 76 is preferably inserted within an annular groove portion 77 formed in inner support cone 34 which intersects each opening 68 in inner support cone 34 to provide a mechanical stop. It will be noted that band 76 is preferably continuous within annular groove portion 77 and is of sufficient length so as to overlap for at least a portion of the circumference therein. Band 76 also preferably has a width 80 which is sized to be retained within annular groove portion 77 of inner support cone 34.

Figure 7:
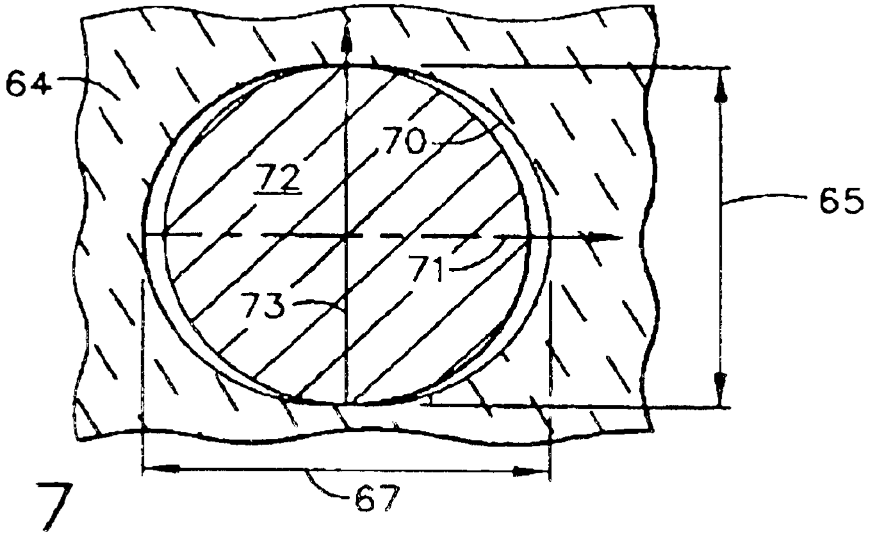
FIG. 7 is an enlarged, partial bottom view of the mounting assembly depicted in FIGS. 5 and 6 taken along line 7—7.

Of course, partial openings 70 in inner liner aft end 64 are preferably sized so that pin members 72, and therefore inner support cone 34 and nozzle support 33, are able to slide radially with respect to inner liner aft end 64 as inner support cone 34 and nozzle support 33 experience thermal growth greater than inner liner 18. Accordingly, inner support cone 34 is able to move between a first radial position (see FIG. 5) and a second radial position (see FIG. 6). Partial openings 70 may be substantially circular (when viewed from a bottom radial perspective) so as to permit only radial movement of pin members 72 and inner support cone 34, but preferably are ovular in shape (see FIG. 7) so that a major axis 71 thereof is aligned substantially parallel to longitudinal centerline axis 12. In this way, pin members 72, nozzle support 33 and inner support cone 34 are able to slide axially with respect to inner liner aft end 64 when thermal growth of nozzle support 33 and inner support cone 34 are greater than inner liner aft end 64. It will be appreciated that nozzle support 33 and inner support cone 34 are also able to move between a first axial position (see FIG. 5) and a second axial position (see FIG. 6). Partial openings 70 will also preferably have a circumferential length 65 along a minor axis 73 which is substantially the same as a diameter 75 for openings 68 so that circumferential movement of inner support cone 34 and support nozzle 33 are discouraged. It will be understood that a length 81 of pin members 72, a depth 84 of partial openings 70, and an axial length 67 along major axis 71 of partial openings 70 will be sized so as to permit a desirable amount of thermal growth for nozzle support 33 and inner support cone 34.

It will further be noted that each pin member 72 may include a partial opening formed therein which includes threads along a sidewall thereof (not shown) like that described above with respect to pin member 46. This is provided so that there will be an easy way of retrieving pin member 72 once device 74 is removed. More specifically, a tool or other device may be threadably mated with such threads of the partial opening so that pin member 72 may be lifted out of opening 68 and partial opening 70.

Figure 8:
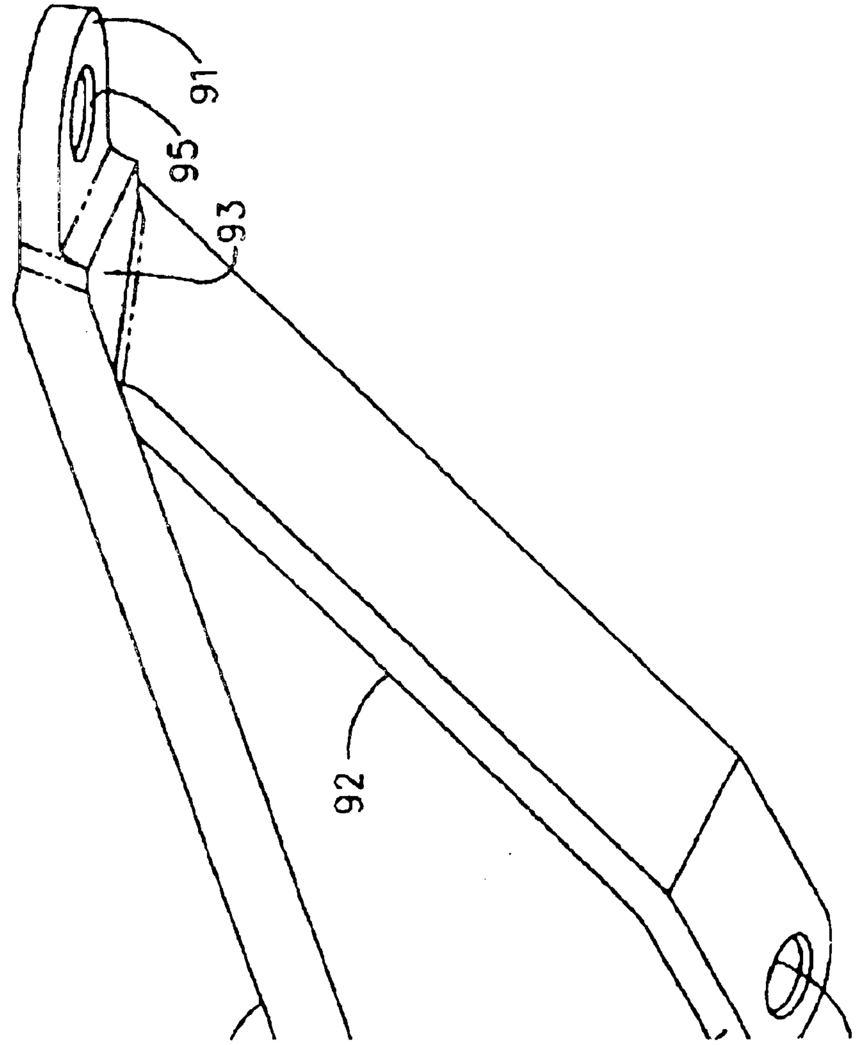
FIG. 8 is a perspective view of a drag link depicted in FIG. 1.

It will further be seen that a plurality of circumferentially spaced support members 86 (known as a drag link) are connected to inner support cone 34 and extend axially forward to be movably connected with a forward end 87 of inner liner 18 via a mounting assembly 88. In particular, FIG. 8 shows that each drag link 86 has a wishbone-type shape and includes first and second portions 90 and 92 which extend from a common junction portion 93. First and second drag link portions 90 and 92 each include an opening 97 and 99 formed in a forward portion 101 and 103, respectively, thereof which are in alignment with openings in inner liner forward end 87, and aft portion of inner cowl 26 and an inner portion of dome 20. Forward portions 101 and 103 are spaced so that a mounting assembly 88 is positioned therebetween. An aft portion 91 of each drag link 86 includes an opening 95 therein so that it may be connected to inner support cone 34 via a bolt 94 and nut 96. It will be appreciated that drag links 86 are provided to assist in minimizing vibrations by providing a measure of stiffness to combustor 10.

Figure 9:
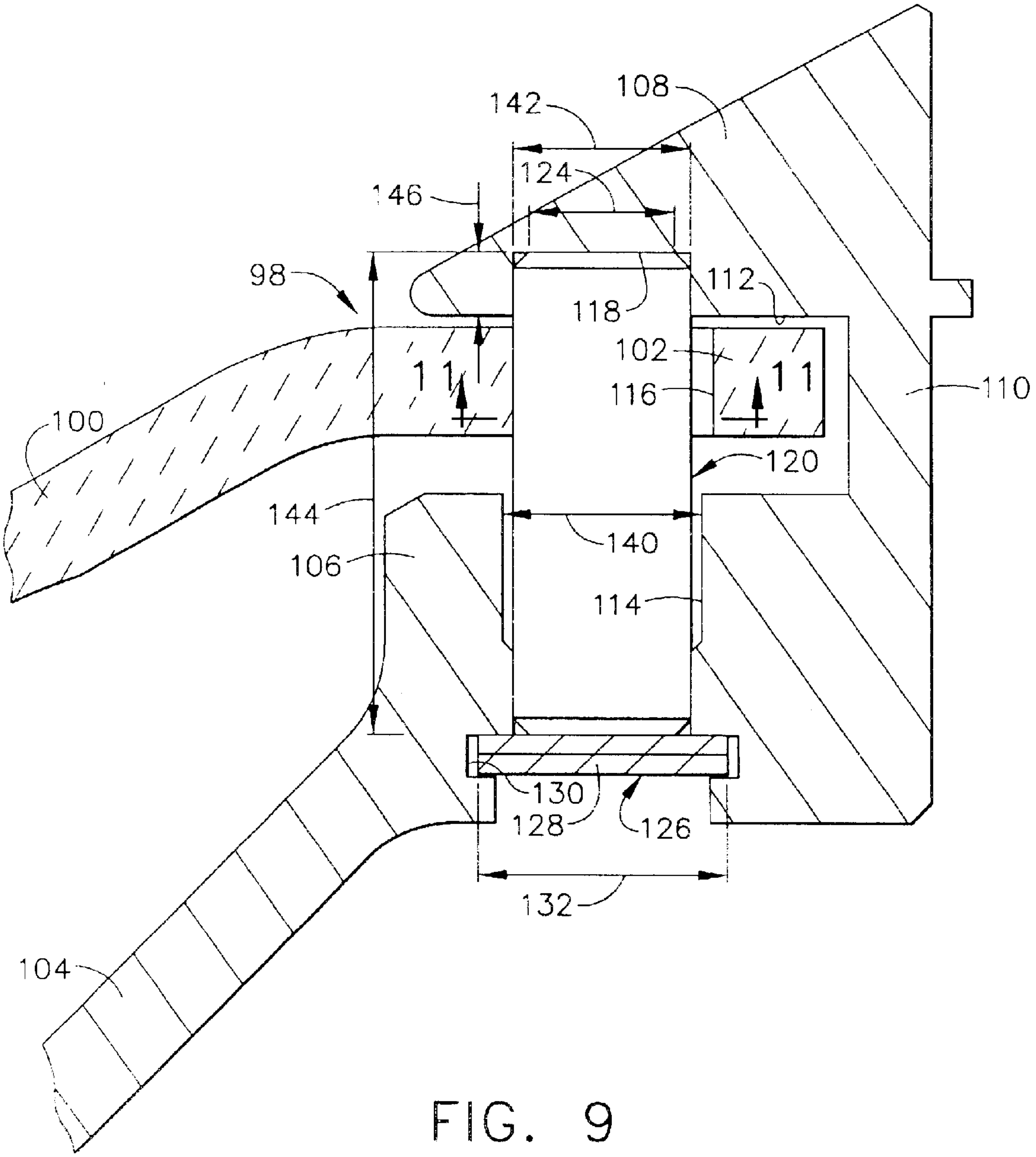
FIG. 9 is an enlarged, partial cross-sectional view of the combustor depicted in FIG. 1, where an alternative embodiment of the mounting assembly for an aft end of the inner liner is shown prior to any thermal growth experienced by the inner liner, the nozzle support and the inner annular cone.
Figure 10:
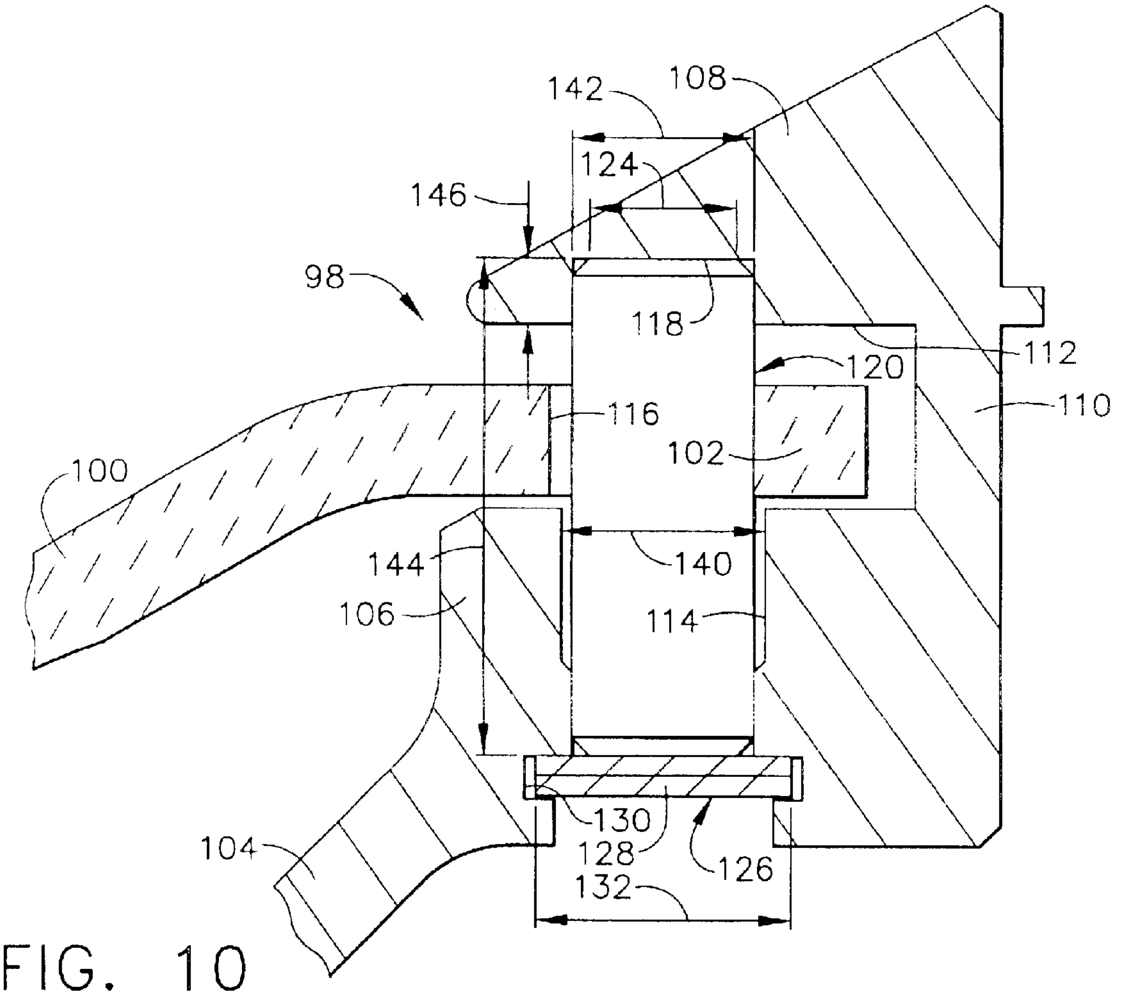
FIG. 10 is an enlarged, partial cross-sectional view of the combustor depicted in FIG. 1, where the alternative embodiment of the mounting assembly for an aft end of the inner liner of FIG. 9 is shown after thermal growth is experienced by the inner liner, the nozzle support and the inner annular cone; and, FIG. 11 is an enlarged, partial bottom view of the mounting assembly depicted in FIGS. 9 and 10 taken along line 11—11.

An alternative mounting assembly 98 for an aft end 102 of an inner liner 100 is depicted in FIGS. 9 and 10. As seen therein, an inner support cone 104 includes a first portion 106 located radially inside inner liner aft end 102, a second portion 108 located radially outside inner liner aft end 102, and a third portion 110 connecting first and second portions 106 and 108 located axially downstream of inner liner aft end 102. It will be noted that an annular gap or opening 112 exists between first and second portions 106 and 108 and that inner liner aft end 102 is positioned therein. In order to movably connect inner liner aft end 102 and inner support cone 104, a plurality of circumferentially spaced openings 114 are formed in first inner support cone portion 106, a plurality of circumferentially spaced openings 116 are formed in inner liner aft end 102, and a plurality of circumferentially spaced partial openings 118 are formed in second inner support cone portion 108, where openings 114, openings 116 and partial openings 118 are in substantial alignment.

It will be noted that a pin member 120 is positioned to extend through each of openings 114 and 116 and be received in a corresponding partial opening 118. Pin members 120 may include a head portion at one end thereof as described above with respect to pin head portion 48. In such case, openings 114 may include a portion which is either chamfered or otherwise has an enlarged diameter so as to better receive such head portion of pin members 120. The location and/or depth of such chamfered portion may also be utilized to verify that pin members 120 are properly positioned within partial openings 118 of inner liner aft end 102.

As seen in FIGS. 9 and 10, pin member 120 does not include a head portion since a device 126 like that described for device 74 above is utilized to retain pin members 120. In particular, it will be understood that a flexible metal band 128 is preferably inserted within an annular groove portion 130 formed in inner support cone 104 which intersects each opening 114 in inner support cone 104 to provide a mechanical stop. It will be noted that band 128 is preferably continuous within annular groove portion 130 and is of sufficient length so as to overlap for at least a portion of the circumference therein. Band 128 also preferably has a width 132 which is sized to be retained within annular groove portion 130 of inner support cone 104.

Figure 11:
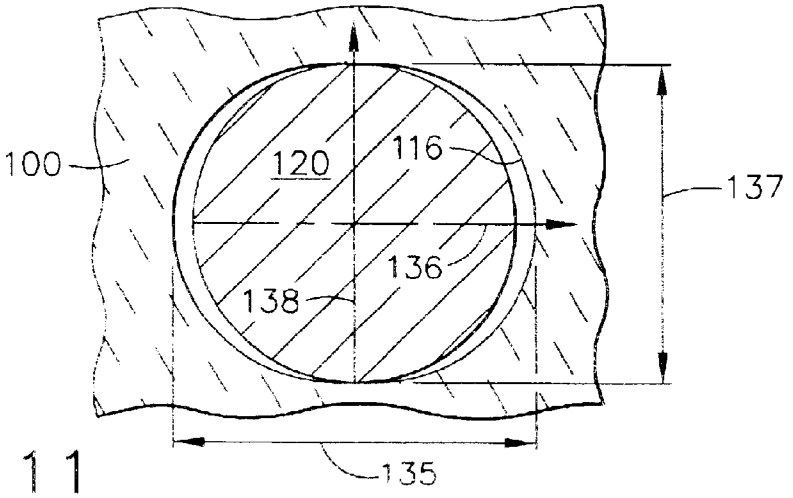

Of course, partial openings 118 in second inner support cone portion 108 are preferably sized so that pin members 120, and therefore inner support cone 104 and nozzle support 33, are able to slide radially with respect to inner liner aft end 102 as nozzle support 33 and inner support cone 104 experience thermal growth greater than inner liner 100. Accordingly, inner support cone 104 is able to move between a first radial position (see FIG. 9) and a second radial position (see FIG. 10). Openings 116 may be substantially circular (when viewed from a bottom radial perspective) so as to permit only radial movement of pin members 120, nozzle support 33 and inner support cone 104, but preferably are ovular in shape (see FIG. 11) so that a major axis 136 thereof is aligned substantially parallel to longitudinal centerline axis 12. In this way, pin members 120, nozzle support 33 and inner support cone 104 are able to slide axially with respect to inner liner aft end 102 when thermal growth of nozzle support 33 and inner support cone 104 are greater than inner liner aft end 102. It will be appreciated that nozzle support 33 and inner support cone 104 are also able to move between a first axial position (see FIG. 9) and a second axial position (see FIG. 10). Openings 118 will also preferably have a circumferential length 137 along a minor axis 138 which is substantially the same as a diameter 140 for openings 114 and a diameter 142 for partial openings 118 so that circumferential movement of nozzle support 33 and inner support cone 104 are discouraged. It will be understood that a length 144 of pin members 120, a depth 146 of partial openings 118, and an axial length 135 along major axis 136 of openings 116 will be sized so as to permit a desirable amount of thermal growth for nozzle support 33 and inner support cone 104.

It will further be noted that pin members 120 may include a partial opening formed therein which includes threads along a sidewall thereof (not shown) like that described above with respect to pin member 46. This is provided so that there will be an easy way of retrieving pin member 120 once device 126 is removed. More specifically, a tool or other device may be threadably mated with such threads of the partial opening so that pin member 120 may be lifted out of openings 114 and 116 and partial openings 118.

Having shown and described the preferred embodiment of the present invention, further adaptations of the mounting assemblies for an aft end of a combustor liner can be accomplished by appropriate modifications by one of ordinary skill in the art without departing from the scope of the invention. In particular, it will be appreciated that mounting assemblies 62 and 98 may also be utilized with an outer liner when the outer support member has a configuration similar to the aft end of inner support cone portion 34 and 104. Further, devices other than ring-shaped member 50 and bands 76 and 126 may be utilized to retain the pin members within their respective areas.

What is claimed is:

1. A mounting assembly for an aft end of a liner of a gas turbine engine combustor including a support member, wherein a longitudinal centerline axis extends through said gas turbine engine, said mounting assembly comprising:

(a) a pin member extending through each one of a plurality of circumferentially spaced openings in a portion of said support member for said combustor and into a plurality of partial openings formed in said aft end of said liner, each said pin member including a head portion at one end thereof; and, (b) a device positioned within each said opening in said support member so as to retain said pin members therein;

wherein said pin members and said support member are able to slide radially with respect to said liner aft end as said support member experiences thermal growth greater than said liner.

2. The liner mounting assembly of claim 1, said support member further comprising a groove portion formed within a sidewall of each opening for receiving a ring-shaped member in a fixed position.

3. The liner mounting assembly of claim 2, wherein a diameter of said openings in said support member are enlarged at a portion opposite said liner so as to receive said pin head portion.

4. The liner mounting assembly of claim 2, wherein said head portion of said pin members has a diameter greater than an inner diameter of said ring member.

5. The liner mounting assembly of claim 1, wherein said openings in said liner aft end are substantially circular.

6. The liner mounting assembly of claim 1, wherein said openings in said liner aft end are substantially ovular in shape with a major axis thereof being aligned substantially parallel to said longitudinal centerline axis.

7. The liner mounting assembly of claim 6, wherein said pin members and said support member are able to slide axially with respect to said liner aft end as said support member experiences thermal growth greater than said liner.

8. The liner mounting assembly of claim 7, wherein said support member is able to move between a first axial position and a second axial position.

9. The liner mounting assembly of claim 1, wherein said liner is made of a ceramic matrix composite.

10. The liner mounting assembly of claim 1, wherein said support member is made of a metal.

11. The liner mounting assembly of claim 1, wherein said support member is able to move between a first radial position and a second radial position.

12. The liner mounting assembly of claim 1, wherein said support member is substantially fixed circumferentially with respect to said liner.

13. The liner mounting assembly of claim 1, said support member further comprising an annular groove portion formed therein for receiving a band member so as to intersect each opening.

14. The liner mounting assembly of claim 1, each said pin member including a threaded partial opening formed therein.

15. The liner mounting assembly of claim 1, wherein said liner is an outer liner of said combustor.

16. The liner mounting assembly of claim 1, wherein said liner is an inner liner of said combustor.

17. A combustor for a gas turbine engine having a longitudinal centerline axis extending therethrough, comprising:

(a) an outer liner having a forward end and an aft end, said outer liner being made of a ceramic matrix composite material;

(b) an outer casing located substantially parallel to said outer liner so as to form an outer passage therebetween, said outer casing being made of a metal;

(c) an outer support member associated with said outer casing and located adjacent said outer liner aft end, said outer support member being made of a metal; and, (d) an assembly for mounting said outer liner aft end to said outer support member, said mounting assembly further comprising:

(1) a pin member extending through each one of a plurality of circumferentially spaced openings in a portion of said outer support member for said combustor and into a plurality of partial openings formed in said aft end of said outer liner, each said pin member including a head portion at one end thereof; and (2) a device positioned within each said opening in said outer support member so as to retain said pin members therein;

wherein said outer support member is movably connected to said outer liner aft end in a radial direction as said outer casing and said outer support member experience thermal growth greater than said outer liner.

18. The combustor of claim 17, wherein said outer support member is movably connected to said outer liner aft end in an axial direction as said outer casing and said outer support member experience thermal growth greater than said outer liner.

19. A combustor for a gas turbine engine having a longitudinal centerline axis extending therethrough, comprising:

(a) an outer liner having a forward end and an aft end, said outer liner being made of a ceramic matrix composite material, (b) an outer casing located substantially parallel to said outer liner so as to form an outer passage therebetween, said outer casing being made of a metal;

(c) an outer support member associated with said outer casing and located adjacent said outer liner aft end, said outer support member being made of a metal; and, (d) an assembly for mounting said outer liner aft end to said outer support member, said mounting assembly further comprising:

(1) a pin member extending through each one of a plurality of circumferentially spaced openings in a first portion of said outer support member for said combustor, a plurality of openings formed in said aft end of said outer liner and into a plurality of partial openings formed in a second portion of said outer support member oriented substantially parallel to said outer support member first portion; and, (2) a device positioned within each said opening in said outer support member so as to retain said pin members therein;

wherein said outer support member is movably connected to said outer liner aft end in a radial direction as said outer casing and said outer support member experience thermal growth greater than said outer liner.

20. A combustor for a gas turbine engine having a longitudinal centerline axis extending therethrough, comprising:

(a) an inner liner having a forward end and an aft end, said inner liner being made of a ceramic matrix composite material;

(b) an inner support cone located substantially parallel to said inner liner so as to form an inner passage therebetween, said inner support come being made of a metal; and, (c) an assembly for mounting said inner liner aft end to said inner support cone, said mounting assembly further comprising:

(1) a pin member extending through each one of a plurality of circumferentially spaced openings in a portion of said inner support cone for said combustor and into a plurality of partial openings formed in said aft end of said inner liner, each said pin member including a head portion at one end thereof; and, (2) a device positioned within each said openings in said inner support cone so as to retain said pin members therein;

wherein said inner support cone is movably connected to said inner liner aft mad in a radial direction as said inner support cone experiences thermal growth greater than said inner liner.

21. The combustor of claim 20, wherein said inner support cone is movably connected to said inner liner aft end in an axial direction as said inner support cone experiences thermal growth greater than said inner liner.

22. A combustor for a gas turbine engine having a longitudinal centerline axis extending therethrough, comprising:

(a) an inner liner having a forward end and an aft end, said inner liner being made of a ceramic matrix composite material;

(b) an inner support cone located substantially parallel to said inner liner so as to form an inner passage therebetween, said inner support cone being made of a metal; and, (c) an assembly for mounting said inner liner aft end to said inner support cone, said mounting assembly further comprising:

(1) a pin member extending through each one of a plurality of circumferentially spaced openings in a first portion of said inner support cone for said combustor, a plurality of openings formed in said aft end of said inner liner and into a plurality of partial openings formed in a second portion of said inner support cone oriented substantially parallel to said inner support cone first portion; and, (2) a device positioned within each said opening in said inner support cone so as to retain said pin members therein;

wherein said inner support cone is movably connected to said inner liner aft end in a radial direction as said inner support cone experiences thermal growth greater than said inner liner.

23. A mounting assembly for an aft end of a liner of a gas turbine engine combustor including a support member, wherein a longitudinal centerline axis extends through said gas turbine engine, said mounting assembly comprising:

(a) a pin member extending through each one of a plurality of circumferentially spaced openings in a first portion of said support member for said combustor, a plurality of openings formed in said aft end of said liner and into a plurality of partial openings formed in a second portion of said support member oriented substantially parallel to said support member first portion, each said pin member including ahead portion at one end thereof; and, (b) a device positioned within each said opening in said support member first portion so as to retain said pin members therein;

wherein said pin members and said support member are able to slide radially with respect to said liner aft end as said support member experiences thermal growth greater than said liner.

24. The liner mounting assembly of claim 23, said support member first portion further comprising a groove portion formed within a sidewall of each opening for receiving said device in a fixed position.

25. The liner mounting assembly of claim 23, said support member further comprising a third portion connecting said first and second portions, wherein a gap for receiving said liner aft end is defined between said first and second support member portions.

26. The liner mounting assembly of claim 23, wherein said openings in said liner aft end are substantially circular.

27. The liner mounting assembly of claim 23, wherein said openings in said liner aft end are substantially ovular an shape with a major axis thereof being aligned substantially parallel to said longitudinal axis.

28. The liner mounting assembly of claim 27, wherein said pin members and said support member are able to slide axially with respect to said liner aft end as said support member experiences thermal growth greater than said liner.

29. The liner mounting assembly of claim 28, wherein said support member is able to move between a first axial position and a second axial position.

30. The liner mounting assembly of claim 23, wherein said liner is made of a ceramic matrix composite.

31. The liner mounting assembly of claim 23, wherein said support member is made of a metal.

32. The liner mounting assembly of claim 23, each said pin member including a threaded partial opening formed therein.

33. The liner mounting assembly of claim 23, wherein said support member is able to move between a first radial position and a second radial position.

34. The liner mounting assembly of claim 23, wherein said support member is substantially fixed circumferentially with respect to said liner.

35. The liner mounting assembly of claim 23, wherein said liner is an outer liner of said combustor.

36. The liner mounting assembly of claims 23, wherein said liner is an inner liner of said combustor.

* * * * *

UNITED STATES PATENT AND TRADEMARK OFFICE

CERTIFICATE OF CORRECTION

PATENT NO. : 6,895,761 B2
DATED : May 24, 2005
INVENTOR(S) : Krista Anne Mitchell et al.

It is certified that error appears in the above-identified patent and that said Letters Patent is hereby corrected as shown below:

Column 11,
Line 3, delete “openings” and substitute -- opening --.
Line 26, delete “mad” and substitute -- end --.

Column 12,
Line 12, delete “ahead” and substitute -- a head --.
Line 33, delete “an” and substitute -- in --.

Signed and Sealed this

Sixteenth Day of May, 2006

Jon W. Dudas

JON W. DUDAS
*Director of the United States Patent and Trademark Office*